(12) United States Patent
Schwarz et al.

(10) Patent No.: US 11,162,977 B2
(45) Date of Patent: Nov. 2, 2021

(54) TUNED OSCILLATOR ATOMIC FORCE MICROSCOPY METHODS AND APPARATUS

(71) Applicant: Yale University, New Haven, CT (US)

(72) Inventors: Udo Schwarz, Woodbridge, CT (US);
Eric Altman, Guilford, CT (US);
Hendrik Hölscher, Weingarten (DE);
Omur Erdinc Dagdeviren, Farmington, CT (US)

(73) Assignee: Yale University, New Haven, CT (US)

( * ) Notice: Subject to any disclaimer, the term of this patent is extended or adjusted under 35 U.S.C. 154(b) by 125 days.

(21) Appl. No.: 15/538,615

(22) PCT Filed: Dec. 21, 2015

(86) PCT No.: PCT/US2015/067065
§ 371 (c)(1),
(2) Date: Jun. 21, 2017

(87) PCT Pub. No.: WO2016/106203
PCT Pub. Date: Jun. 30, 2016

(65) Prior Publication Data
US 2019/0056428 A1    Feb. 21, 2019

Related U.S. Application Data

(60) Provisional application No. 62/096,237, filed on Dec. 23, 2014.

(51) Int. Cl.
*G01Q 60/32* (2010.01)
*G01Q 30/04* (2010.01)
*G01Q 10/06* (2010.01)

(52) U.S. Cl.
CPC ............ *G01Q 60/32* (2013.01); *G01Q 10/06* (2013.01); *G01Q 30/04* (2013.01)

(58) Field of Classification Search
None
See application file for complete search history.

(56) References Cited

U.S. PATENT DOCUMENTS

| 5,965,218 A | 10/1999 | Bothra et al. |
| 6,008,489 A | 12/1999 | Elings et al. |

(Continued)

OTHER PUBLICATIONS

Hoffmann et al. "Direct measurement of interatomic force gradients using an ultra-low-amplitude atomic force microscope" Proceedings of The Royal Society A (May 2001) (Year: 2001).*

(Continued)

*Primary Examiner* — James Choi
(74) *Attorney, Agent, or Firm* — Wolf, Greenfield & Sacks, P.C.

(57) ABSTRACT

Techniques for operating an atomic force microscope, the atomic force microscope comprising a cantilever and configured to image a surface of a sample using a probe tip coupled to the cantilever, the techniques comprising using a controller to perform: obtaining, based on at least one intrinsic parameter of the cantilever, a first quality factor and a first free oscillation amplitude, wherein the cantilever exhibits only one stable oscillation state when oscillating at the first free oscillation amplitude and operating at the first quality factor; and controlling the cantilever to exhibit the only one stable oscillation state by controlling the cantilever to oscillate at a fixed frequency at or near a resonance frequency of the cantilever, oscillate at the first free oscillation amplitude, and operate at the first quality factor.

13 Claims, 10 Drawing Sheets

(56) References Cited

U.S. PATENT DOCUMENTS

| | | | | |
|---|---|---|---|---|
| 6,330,824 | B1* | 12/2001 | Erie | G01B 5/28 |
| | | | | 73/105 |
| 7,904,966 | B2 | 3/2011 | Kobayashi et al. | |
| 2005/0066714 | A1* | 3/2005 | Adderton | G01Q 10/045 |
| | | | | 73/105 |
| 2009/0206953 | A1 | 8/2009 | Pavlov et al. | |
| 2010/0011471 | A1* | 1/2010 | Jesse | G01Q 10/06 |
| | | | | 850/21 |
| 2012/0278958 | A1* | 11/2012 | Yu | B82Y 15/00 |
| | | | | 850/33 |
| 2013/0111636 | A1* | 5/2013 | Jesse | G01Q 30/04 |
| | | | | 850/33 |
| 2014/0223615 | A1 | 8/2014 | Shi et al. | |

OTHER PUBLICATIONS

Hölscher et al., Theory of amplitude modulation atomic force microscopy with and without Q-Control, International Journal of Non-Linear Mechanics, vol. 42, Issue 4, 608-625 (May 2007) (Year: 2007).*
Garcia et al., Dynamics of a vibrating tip near or in intermittent contact with a surface, Phys. Rev. B 61, 13381 (May 15, 2000) (Year: 2000).*
Wutscher et al., Atomic force microscopy at ambient and liquid conditions with stiff sensors and small amplitudes, Rev. Sci. Instrum. 82, 093703 (2011) (Year: 2011).*
Tamayo et al. "High-Q Dynamic Force Microscopy in Liquid and Its Application to Living Cells", 81 Biophysical Journal vol. 526-537 (Jul. 2001) (Year: 2001).*
Extended European Search Report dated Jul. 13, 2018 in connection with International Application No. 15874241.1.
Anczykowski et al., Analysis of the interaction mechanisms in dynamic mode SFM by means of experimental data and computer simulation. Applied Physics A. Materials Science & Processing. Jan. 1998; A66: S885-9.
Garcia et al., Dynamics of a vibrating tip near or in intermittent contact with a surface. Physical Review B. May 2000; 61(20): R13381-R13384.
Holscher et al., Theory of amplitude modulation atomic force microscopy with and without Q-Control. International Journal of Non-Linear Mechanics. Jun. 2007; 42(4): 608-25.
Solares. Eliminating bistability and reducing sample damage through frequency and amplitude modulation in tapping-mode atomic force microscopy. Measurement Science and Technology. Mar. 2007; 18(3): 592-600.
International Search Report and Written Opinion dated Feb. 12, 2016 for Application No. PCT/US2015/067065.
Albers et al., Combined low-temperature scanning tunneling/atomic force microscope for atomic resolution imaging and site-specific force spectroscopy. Review of Scientific Instruments. Mar. 6, 2008;79(3):033704.
Albers et al., Three-dimensional imaging of short-range chemical forces with picometre resolution. Nature Nanotechnology. May 2009;4(5):307.
Albrecht et al., Frequency modulation detection using high-Q cantilevers for enhanced force microscope sensitivity. Journal of Applied Physics. Jan. 15, 1991;69(2):668-73.
Allers et al., Dynamic scanning force microscopy at low temperatures on a van der Waals surface: graphite (0001). Applied Surface Science. Feb. 1, 1999;140(3-4):247-52.
Ancykowski et al., Analysis of the interaction mechanisms in dynamic mode SFM by means of experimental data and computer simulation. Applied Physics A: Materials Science & Processing. Mar. 1, 1998;66:S885-9.
Ancykowski et al., Basic properties of dynamic force spectroscopy with the scanning force microscope in experiment and simulation. Ultramicroscopy. Dec. 1, 1996;66(3-4):251-9.
Ancykowski et al., Cantilever dynamics in quasinoncontact force microscopy: Spectroscopic aspects. Physical Review B. Jun. 15, 1996;53(23):15485.
Bammerlin et al., Dynamic SFM with true atomic resolution on alkali halide surfaces. Applied Physics A: Materials Science & Processing. Mar. 1, 1998;66:S293-4.
Batra et al., A study of graphite surface with STM and electronic structure calculations. Surface Science. Mar. 1, 1987;181(1-2):126-38.
Baykara et al., Atom-specific forces and defect identification on surface-oxidized Cu(100) with combined 3D-AFM and STM measurements. Physical Review B. Apr. 12, 2013;87(15):155414.
Binnig et al., Atomic force microscope. Physical review letters. Mar. 3, 1986;56(9):930-3.
Binnig et al., Atomic resolution with atomic force microscope. EPL (Europhysics Letters). Jun. 15, 1987;3(12):1281.
Castanié et al., Image calculations with a numerical frequency-modulation atomic force microscope. The Journal of Physical Chemistry C. May 14, 2013;117(20):10492-501.
Didizulis et al., Chemistry of copper overlayers on zinc oxide single-crystal surfaces: model active sites for copper/zinc oxide methanol synthesis catalysts. Journal of the American Chemical Society. Aug. 1989;111(18):7110-23.
Erlandsson et al., Force interaction in low-amplitude ac-mode atomic force microscopy:. cantilever simulations and comparison with data from Si (111) 7×7. Applied Physics A: Materials Science & Processing. Mar. 1, 1998;66:S879-83.
Erlandsson et al., Inequivalent atoms and imaging mechanisms in ac-mode atomic-force microscopy of Si (111) 7×7. Physical Review B. Sep. 15, 1996;54(12):R8309.
García et al., Dynamic atomic force microscopy methods. Surface Science Reports. Sep. 1, 2002;47(6-8):197-301.
Giessibl et al., Calculation of the optimal imaging parameters for frequency modulation atomic force microscopy. Applied Surface Science. Feb. 1, 1999;140(3-4):352-7.
Giessibl et al., Comparison of force sensors for atomic force microscopy based on quartz tuning forks and length-extensional resonators. Physical Review B. Sep. 6, 2011;84(12):125409.
Giessibl, A direct method to calculate tip—sample forces from frequency shifts in frequency-modulation atomic force microscopy. Applied Physics Letters. Jan. 1, 2001;78(1):123-5.
Giessibl, Advances in atomic force microscopy. Reviews of Modern Physics. Jul. 29, 2003;75(3):949-83.
Giessibl, Atomic resolution of the silicon (111)-(7×7) surface by atomic force microscopy. Science. Jan. 6, 1995;267(5194):68-71.
Giessibl, High-speed force sensor for force microscopy and profilometry utilizing a quartz tuning fork. Applied Physics Letters. Dec. 28, 1998;73(26):3956-8.
Hembacher et al., Revealing the hidden atom in graphite by low-temperature atomic force microscopy. Proceedings of the National Academy of Sciences. Oct. 28, 2003 ;100(22):12539-42.
Hölscher et al., Consequences of the stick-slip movement for the scanning force microscopy imaging of graphite. Physical Review B. Jan. 15, 1998;57(4):2477.
Hölscher et al., Determination of tip-sample interaction potentials by dynamic force spectroscopy. Physical Review Letters. Dec. 6, 1999;83(23):4780.
Hölscher et al., Interpretation of "true atomic resolution" images of graphite (0001) in noncontact atomic force microscopy. Physical Review B. Sep. 15, 2000;62(11):6967.
Hölscher et al., Principles of atomic friction: from sticking atoms to superlubric sliding. Philosophical Transactions of the Royal Society A: Mathematical, Physical and Engineering Sciences. Dec. 20, 2007;366(1869):1383-404.
Hölscher et al., Q-controlled dynamic force spectroscopy. Surface science. Sep. 1, 2002;515(2-3):517-22.
Hölscher et al., Quantitative analysis of dynamic-force-spectroscopy data on graphite (0001) in the contact and noncontact regimes. Physical Review B. May 15, 2000;61(19):12678.
Hölscher et al., Simulation of a scanned tip on a NaF (001) surface in friction force microscopy. EPL (Europhysics Letters). Oct. 1, 1996;36(1):19.

(56) References Cited

OTHER PUBLICATIONS

Hölscher et al., Theory of amplitude modulation atomic force microscopy with and without Q-control. International Journal of Non-linear mechanics. May 1, 2007;42(4):608-25.

Hölscher et al., Theory of phase-modulation atomic force microscopy with constant-oscillation amplitude. Journal of Applied Physics. Mar. 15, 2008;103(6):064317.

Hölscher et al., Theory of Q-controlled dynamic force microscopy in air. Journal of Applied Physics. Apr. 15, 2006;99(8):084311.

Katan et al., Quantitative force versus distance measurements in amplitude modulation AFM: a novel force inversion technique. Nanotechnology. Apr. 1, 2009;20(16):165703.

Kawai et al., Atomically resolved amplitude modulation dynamic force microscopy with a high-frequency and high-quality factor cantilever. Applied physics letters. Jul. 3, 2006;89(1):013108.

Kawai et al., Surface-relaxation-induced giant corrugation on graphite (0001). Physical Review B. Mar. 30, 2009;79(11):115440.

Lantz et al. Low Temperature Scanning Force Microscopy of the Si (111)—(7×7) Surface. Physical review letters. Mar. 20, 2000;84(12):2642-5.

Leibsle, STM studies of oxygen-induced structures and nitrogen coadsorption on the Cu (100) surface: evidence for a one-dimensional oxygen reconstruction and reconstructive interactions. Surface Science. Aug. 20, 1995;337(1-2):51-66.

Loppacher et al., Fast digital electronics for application in dynamic force microscopy using high-Q cantilevers. Applied Physics A: Materials Science & Processing. Mar. 1, 1998;66:S215-8.

Luan et al., The breakdown of continuum models for mechanical contacts. Nature. Jun. 2005;435(7044):929-32.

Mo et al., Friction laws at the nanoscale. Nature. Feb. 2009;457(7233):1116.

Mönig et al., Understanding scanning tunneling microscopy contrast mechanisms on metal oxides: a case study. ACS Nano. Oct. 15, 2013;7(11):10233-44.

Ohnesorge et al., True atomic resolution by atomic force microscopy through repulsive and attractive forces. Science. Jun. 4, 1993;260(5113):1451-6.

Ondráĉcek et al., Forces and currents in carbon nanostructures: are we imaging atoms? Physical Review Letters. Apr. 25, 2011;106(17):176101.

Peña et al., TiO2-supported metal oxide catalysts for low-temperature selective catalytic reduction of NO with NH3: I. Evaluation and characterization of first row transition metals. Journal of catalysis. Jan. 25, 2004;221(2):421-31.

Rodriguez et al., Theory of Q control in atomic force microscopy. Applied Physics Letters. Jun. 30, 2003;82(26):4821-3.

Sader et al., Accurate formulas for interaction force and energy in frequency modulation force spectroscopy. Applied Physics Letters. Mar. 8, 2004;84(10):1801-3.

Smirniotis et al., Low-Temperature Selective Catalytic Reduction (SCR) of NO with NH3 by Using Mn, Cr, and Cu Oxides Supported on Hombikat TiO2. Angewandte Chemie International Edition. Jul. 2, 2001;40(13):2479-82.

Wang et al., In situ studies of the active sites for the water gas shift reaction over Cu—CeO2 catalysts: complex interaction between metallic copper and oxygen vacancies of ceria. The Journal of Physical Chemistry B. Jan. 12, 2006;110(1):428-34.

Zhong et al., Fractured polymer/silica fiber surface studied by tapping mode atomic force microscopy. Surface Science Letters. Jun. 10, 1993;290(1-2):L688-92.

Kawai et al., Ultrasensitive detection of lateral atomic-scale interactions on graphite (0001) via bimodal dynamic force measurements. Physical Review B. Feb. 17, 2010;81(8):085420.

Luan et al., Contact of single asperities with varying adhesion: Comparing continuum mechanics to atomistic simulations. Physical Review E. Aug. 15, 2006;74(2):026111.

\* cited by examiner

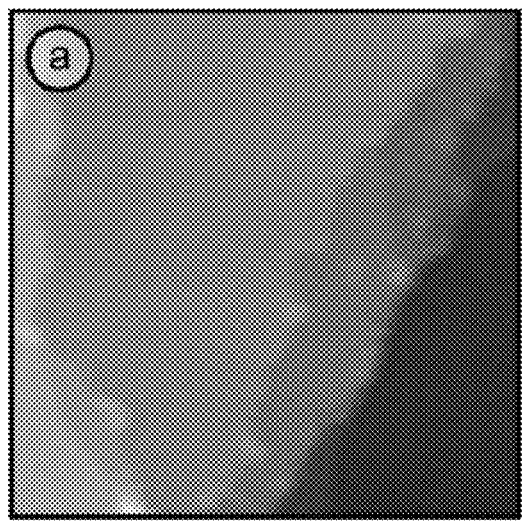
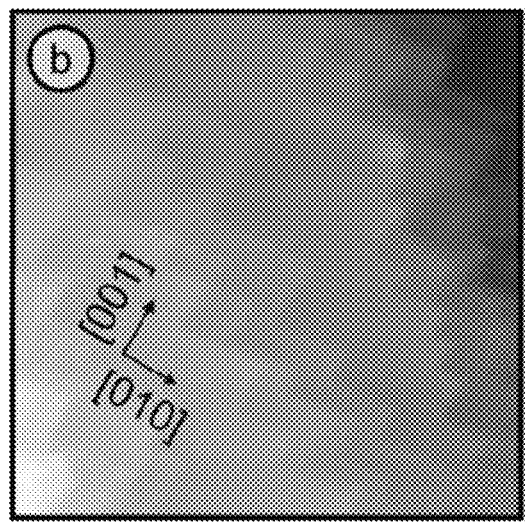
FIG. 6A   FIG. 6B
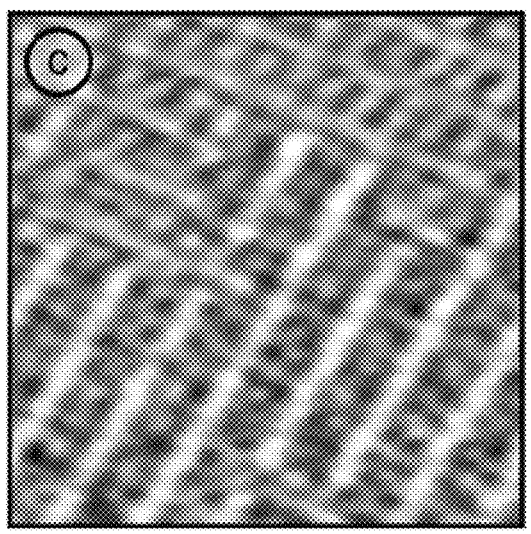
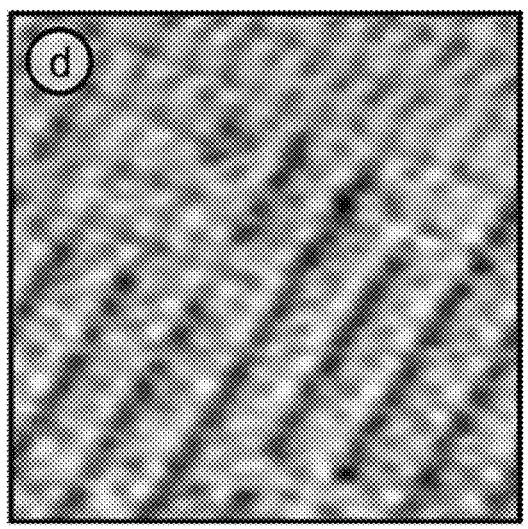
FIG. 6C   FIG. 6D

TUNED OSCILLATOR ATOMIC FORCE MICROSCOPY METHODS AND APPARATUS

CROSS-REFERENCE TO RELATED APPLICATIONS

The application is a national phase of International Application No. PCT/US2015/067065, filed on Dec. 21, 2015, which claims the benefit under 35 U.S.C. 119(e) of U.S. Provisional Patent Application Ser. No. 62/096,237 entitled "TUNED OSCILLATOR ATOMIC FORCE MICROSCOPY METHODS AND APPARATUS," filed Dec. 23, 2014, which is herein incorporated by reference in its entirety.

FEDERALLY SPONSORED RESEARCH

This invention was made with government support under DMR-1119826 award by the National Science Foundation and DOE DE-FG02-06ER15834 awarded by the Department of Energy, Office of Basic Research. The government has certain rights in the invention.

BACKGROUND

Image formation in atomic force microscopy (AFM) relies on detecting interactions between a surface of a sample of interest and a probe tip. High resolution images may be obtained by using a sharp (e.g., "atomically sharp") tip to track the surface at a very close distance, but without coming into contact with the surface, as such contact could blunt the tip and reduce imaging resolution. In this so-called "non-contact" AFM (NC-AFM) regime, the probe tip is attached to a small cantilever that is oscillated near the surface of interest. The effect of the surface force field on the cantilever's oscillation is measured and used to regulate the distance between the tip and surface in order to avoid physical contact between the tip and the surface. Under favorable conditions, this distance can be regulated so precisely that the signal controlling the vertical position of the sample accurately reflects the topography of the surface. Since the effects of the surface force field on the cantilever's oscillation are larger (and therefore easier to detect) when the cantilever is oscillating at or near one of its resonance frequencies, the cantilever is typically operated at such frequencies.

Two different types of non-contact atomic force microscopy are amplitude modulation atomic force microscopy (AM-AFM) and frequency modulation atomic force microscopy (FM-AFM). In AM-AFM the cantilever is excited at a pre-selected fixed frequency with constant energy input while either the drop of the resulting oscillation amplitude A or the phase difference $\varphi$ between driving and actual cantilever oscillation are used for controlling the probe tip to surface distance. Thus, AM-AFM may be implemented using only one feedback loop. FM-AFM involves tracking the position of the peak of the resonance curve rather instead of detecting the value of either A or $\varphi$ at a constant driving frequency, as done in AM-AFM. FM-AFM requires the use of at least two, and most commonly three, interacting feedback loops.

In AM-AFM, as the cantilever approaches the surface of interest, the surface forces cause the cantilever's oscillation characteristics to change such that the cantilever's resonance frequency moves away from the cantilever's eigenfrequency $f_0$, which is the resonance frequency of the cantilever when the cantilever oscillates unperturbed by external forces. In turn, the shift of the resonance frequency may be used to regulate the distance between the tip and the surface. For example, let $f_{RPW}$ denote the width of the resonance peak at half of its maximum height, and consider the quality factor $Q=f_0/f_{RPW}$. For typical commercial cantilevers, with $f_0=300$ kHz and spring constant k=30 N/m, values of $Q \approx 300$ are found in ambient conditions. When driving such a cantilever at its eigenfrequency $f_0$ with constant input power, such that the amplitude A is approximately 10 nm for the free cantilever not experiencing any force from the surface of the sample, the amplitude A is found to drop considerably as the tip approaches the surface due to the interaction-induced shift of the peak position described above. Measuring this drop in free oscillation amplitude may be used to regulate the tip-sample distance.

SUMMARY

A new mode of performing high-resolution non-contact AM-AFM, termed tuned oscillation AFM (TO-AFM), is introduced. TO-AFM involves selecting operational parameters for a cantilever (e.g., free oscillation amplitude and quality factor) such that, when the cantilever operates in accordance with the selected operational parameters, the cantilever exhibits a single stable oscillation state at all times during approach to a surface of interest, retraction from the surface of interest, and/or scanning of the surface of interest. The operational parameters also may be selected to maximize relative changes in amplitude and/or phase of the cantilever's oscillation to make detection of changes easier and to be compatible with the measurement bandwidth of the AFM to allow for fast scanning times. Operating the cantilever in accordance with the selected parameters may comprise using electronic Q-control to drive the cantilever's Q factor to a desired value or values (e.g., a Q factor of less than 300 or a Q factor of 300-1000).

Some embodiments provide for a method of operating an atomic force microscope, the atomic force microscope comprising a cantilever and configured to image a surface of a sample using a probe tip coupled to the cantilever. The method comprises using a controller to perform: obtaining, based on at least one intrinsic parameter of the cantilever, a first quality factor and a first free oscillation amplitude, wherein the cantilever exhibits only one stable oscillation state when oscillating at the first free oscillation amplitude and operating at the first quality factor; and controlling the cantilever to exhibit the only one stable oscillation state by controlling the cantilever to oscillate at a fixed frequency at or near a resonance frequency of the cantilever, oscillate at the first free oscillation amplitude, and operate at the first quality factor.

Some embodiments provide for a system for controlling operation of an atomic force microscope, the atomic force microscope comprising a cantilever and configured to image a surface of a sample using a probe tip coupled to the cantilever. The system comprises a controller configured to perform: obtaining, based on at least one intrinsic parameter of the cantilever, a first quality factor and a first free oscillation amplitude, wherein the cantilever exhibits only one stable oscillation state when oscillating at the first free oscillation amplitude and operating at the first quality factor; and controlling the cantilever to exhibit the only one stable oscillation state by controlling the cantilever to oscillate at a fixed frequency at or near a resonance frequency of the cantilever, oscillate at the first free oscillation amplitude, and operate at the first quality factor.

Some embodiments provide for an atomic force microscope configured to image a surface of a sample, the atomic force microscope comprising: a cantilever; a probe tip coupled to the cantilever; and a controller configured to perform: obtaining a first quality factor and a first free oscillation amplitude, wherein the cantilever exhibits only one stable oscillation state when oscillating at the first free oscillation amplitude and operating at the first quality factor; and controlling the cantilever to exhibit the only one stable oscillation state by controlling the cantilever to oscillate at a fixed frequency at or near a resonance frequency of the cantilever, oscillate at the first free oscillation amplitude, and operate at the first quality factor.

In some embodiments, controlling the cantilever to operate at the first quality factor comprises using quality factor control circuitry to automatically control the cantilever to operate at the first quality factor.

In some embodiments, the first quality factor is less than 300. In some embodiments, the first quality factor is between 300 and 1000. In some embodiments, the quality factor is less than 5000.

In some embodiments, the first free oscillation amplitude is smaller than a decay length of an interaction potential between the probe tip and the sample. In some embodiments, the first free oscillation amplitude is smaller than 3 Angstroms.

In some embodiments, controlling the cantilever comprises controlling the cantilever to operate such that the probe tip is at a distance of less than 100 Angstroms from the surface of the sample. In some embodiments, controlling the cantilever comprises controlling the cantilever to operate such that the probe tip is at a distance of less than 50 Angstroms from the surface of the sample. Controlling the cantilever comprises controlling the cantilever to operate such that the probe tip is at a distance of less than 10 Angstroms from the surface of the sample. In some embodiments, controlling the cantilever comprises controlling the cantilever to operate such that the probe tip is at a distance of 2-10 Angstroms from the surface of the sample.

In some embodiments, the obtaining includes obtaining a plurality of quality factors and a plurality of free oscillation amplitudes; and selecting, as the first quality factor and the first free oscillation amplitude, a quality factor in the plurality of quality factors and a free oscillation amplitude that maximize relative amplitude and/or phase changes in the oscillation of the cantilever during approach to the surface of the sample.

In some embodiments, the obtaining includes obtaining a plurality of quality factors and a plurality of free oscillation amplitudes; and selecting, as the first quality factor and the first free oscillation amplitude, a quality factor in the plurality of quality factors and a free oscillation amplitude that correspond to a desired measurement bandwidth of the atomic force microscope.

In some embodiments, the at least one intrinsic parameter of the cantilever includes the resonance frequency of the cantilever and/or a spring constant of the cantilever.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 6A-6D illustrate application of TO-AFM to generating an image of surface-oxidized copper, in accordance with some embodiments of the technology described herein.

DETAILED DESCRIPTION

Figure 1:
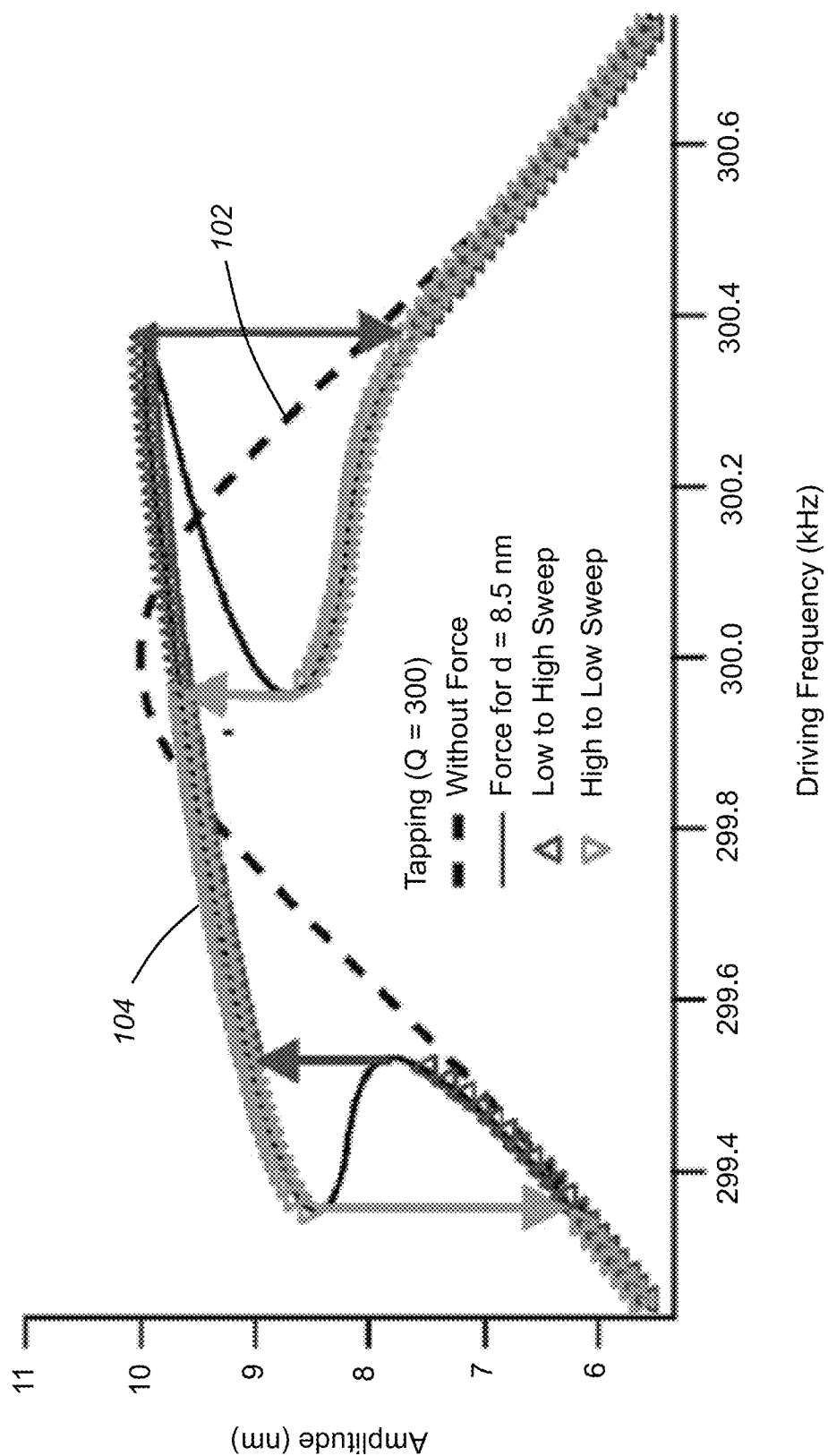
FIG. 1 is a diagram illustrating distortion of a cantilever resonance curve due to tip-sample interaction.

The inventors have recognized and appreciated that conventional techniques for performing AM-AFM generally do not allow for high-resolution (e.g., atomic resolution) of surfaces in the non-contact regime due to cantilever oscillation instabilities during approach to, scanning of, or retraction from the surface of interest. As the cantilever approaches the surface of interest, the oscillation characteristics of the cantilever change such that the cantilever intermittently exhibits multiple stable oscillation states. In particular, the surface forces distort the shape of the cantilever's resonance curve, which in the absence of external forces reflects a symmetric Laurentzian function (see e.g., FIG. 1 which shows an example of an undistorted resonance curve 102 (dashed) for a cantilever and a corresponding distorted resonance curve 104 (solid)). As a result, the cantilever may oscillate at any one of multiple different amplitudes for a given driving frequency. Upon further approach of the cantilever to the surface, one of the multiple oscillation states "dies out" causing the tip to "jump" into (e.g., tap) the surface. The cantilever may not only exhibit multiple stable oscillation states upon approaching the surface of interest, but also upon scanning the surface and/or being retracted from the surface. The presence of multiple stable cantilever oscillation states prevents high-resolution imaging in most instances, and the mode of operation is reduced to the so-called "tapping" mode with the cantilever intermittently coming into contact with the surface, where significant repulsive forces act at closest tip-sample distances.

The inventors have also recognized and appreciated that the above-described "cantilever instability" problem of resonance peak bending that causes a cantilever to exhibit multiple stable oscillation states is exacerbated in a vacuum. The reason for this is that the lack of air damping in a vacuum causes the Q-factors of many commercial silicon cantilevers to increase by an order of magnitude or more. The correspondingly shrinking effective width of the resonance peak, combined with increasingly severe bending of the resonance peak, makes it even more difficult for the tip to enter the regime where the short-range attractive forces act. Instead, the presence of multiple stable oscillation states causes the tip to jump from a point far from the surface into a tapping regime. In addition, the speed with which the AFM is able to respond (e.g., by controlling the tip-sample distance) to perturbations in cantilever oscillation induced by the surface is given by the time constant $\tau=Q/\pi f_0$. Since higher Q values mean lower measurement bandwidths, the system's bandwidth may end up being impractical for room temperature operation. As a result, AM-AFM imaging has not been successfully applied in a vacuum using standard commercial cantilevers operated at their first resonance.

Although FM-AFM techniques may be used to avoid the above-described cantilever instability problem, FM-AFM requires the use of at least two and most commonly three interacting feedback loops, which are often difficult to adjust properly within the limits defined by the desired measurement bandwidth.

The inventors have recognized and appreciated that when a cantilever is operated at certain favorable combinations of parameters (e.g., certain combinations of free oscillation amplitudes and quality factors), the cantilever may exhibit a single stable oscillation state in a desired region of operation (e.g., at a desired operational distance or range of operational distances from the surface). Accordingly, in some embodiments, a new mode for performing high-resolution non-contact AM-AFM is provided whereby an atomic force microscope is operated using a set of parameters for which the cantilever does not exhibit multiple stable oscillation states and avoids the instabilities that would otherwise prevent the continuous probing of tip-sample interactions during approach of the cantilever to the surface of interest, retraction of the cantilever from the surface of interest, and/or scanning of the cantilever across the surface of interest. The new mode is referred to herein as "tuned oscillator atomic force microscopy" (TO-AFM). In this way, oscillation of the cantilever may be controlled so that it has a single stable oscillation state at all times during approach of the cantilever to the surface of interest, retraction of the cantilever from the surface of interest, and/or scanning of the cantilever across the surface of interest.

In some embodiments, intrinsic parameters of a cantilever (e.g., a resonance frequency of the cantilever and spring constant of the cantilever) may be used to obtain a set of free oscillation amplitudes and quality factors for which the cantilever has a single stable oscillation state within a chosen range of operation (e.g., driving frequency of the cantilever oscillation and range of tip-sample distances). In turn, the cantilever may be operated such that it oscillates at one or more of the obtained free oscillation amplitudes and operates at one or more of the obtained quality factors. Operating the cantilever at one or more of the obtained quality factors may be performed using automatic Q-control techniques. In this way, in the TO-AFM mode, the cantilever is controlled to have a single stable oscillation state thereby avoiding the above-described cantilever instability problem and allowing for high-resolution non-contact AFM imaging.

In some embodiments, the free oscillation amplitudes and quality factors may satisfy one or more other criteria in addition to ensuring that the cantilever exhibits only a single stable oscillation state. For example, combinations of free oscillation amplitudes and quality factors may be selected so as to maximize the relative change in amplitude and/or phase in response to attractive surface forces thereby making these changes easier to detect using lock-in electronics (e.g., a lock-in amplifier). As another example, combinations of free oscillation amplitudes and quality factors may be selected such that the cantilever response time $\tau=Q/(\pi f_0)=1/\pi f_{RPW}$, sometimes termed the "natural bandwidth" of the cantilever, is compatible with the measurement bandwidth of the atomic force microscope.

Performing TO-AFM imaging by choosing operational parameters in accordance with embodiments described herein and controlling (optionally by employing automatic Q-control) the cantilever to operate in accordance with the chosen operational parameters not only prevents mechanical instabilities during tip approach with fixed driving frequency, but also provides for cantilever oscillation amplitude and phase changes sufficiently large to allow for accurate tip-sample distance control using conventional lock-in measurement technology. Unlike conventional NC-AFM techniques, TO-AFM allows for robust position control within both the attractive (i.e., non-contact) and repulsive (i.e., contact) regimes while employing only one feedback loop. In particular, TO-AFM is more robust during practical measurements than conventional FM-AFM methods because, as described above, the FM-AFM detection schemes require use of two or three interacting feedback loops, which easily destabilize during operation, even when adjusted by an experienced operator. By contrast, TO-AFM is based on the simpler AM-AFM detection scheme in which only one parameter (either oscillation amplitude or phase shift between driving signal and cantilever response) is tracked by using a single feedback loop. Moreover, the simple electronic configuration allows for realization of very fast cantilever response times. Thus, very fast imaging may be realized by performing TO-AFM with appropriate high frequency cantilevers.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Figure 2:
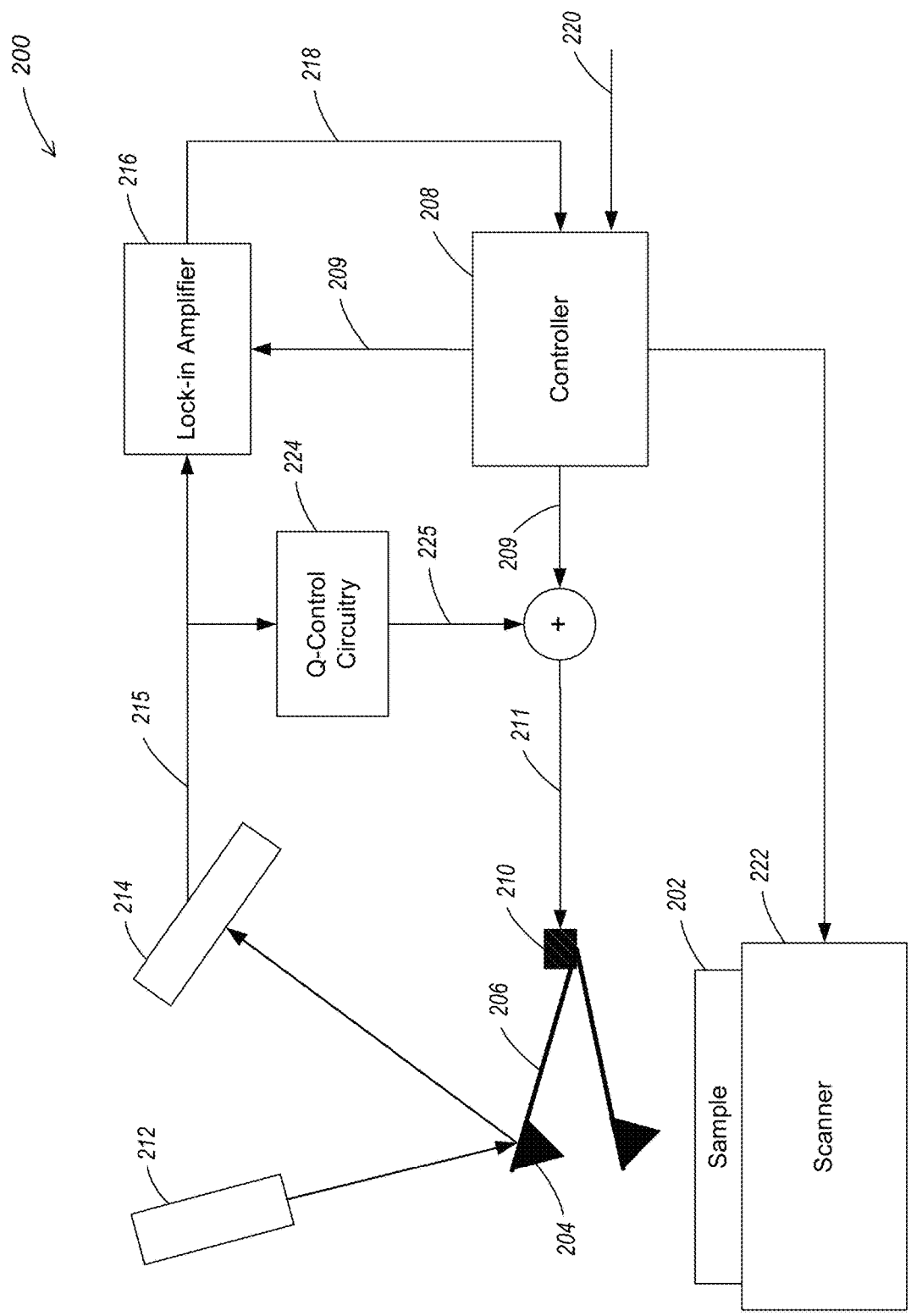
FIG. 2 is a block diagram of an illustrative AFM system configured to perform tuned oscillation atomic force microscopy (TO-AFM), in accordance with some embodiments of the technology described herein.

FIG. 2 is a block diagram of an illustrative atomic force microscopy system 200 configured to operate in a TO-AFM mode, in accordance with some embodiments of the technology described herein. AFM system 200 is configured to image sample 202 by regulating the distance between sample 202 and probe tip 204, which is coupled to oscillating cantilever 206. Oscillation of cantilever 206 may be driven by a dither piezo 210 in response to control signal 211 that is based, at least in part, on a constant-amplitude fixed-frequency control signal 209 generated by controller 208. The control signal 209 generated by controller 208 is also provided to lock-in amplifier 216 in order to serve as a reference signal during demodulation. Although, in the illustrated embodiment, oscillation of cantilever 206 is driven by dither piezo 210, in other embodiments, the oscillation of cantilever 206 may be achieved in any other suitable way, as aspects of the technology described herein are not limited in this respect.

In the illustrated embodiment, deflection of cantilever 206 is measured via the laser beam detection method, though other techniques for measuring cantilever displacement may be used (examples of which are provided below), as aspects of the technology described herein are not limited in this respect. Laser light generated by laser light source 212 is reflected off the back of cantilever 206 and detected by photo electric device 214 comprising multiple closely-spaced photo diodes. Angular displacement of cantilever 206 results in a photo diode of the photo electric device 214 receiving more light than another photo diode and the difference between the output signals of the photo diodes is proportional to the amount of cantilever deflection.

Accordingly, photoelectric device 214 outputs a signal 215 proportional to the amount of deflection of cantilever 206. The signal 215 output from photo electric device 214 is provided to lock-in amplifier 216 which, together with the reference signal 209 provided by controller 208 (e.g., the control signal 209 used to drive the cantilever oscillation) is used to identify the amplitude 218 and phase (not shown) of the oscillation of cantilever 206. In turn, amplitude 218 together with one or more other control inputs 220 may be used to control the vertical position of scanner 222, thereby regulating the distance between sample 202 and probe tip 204 as a function of the amplitude of the oscillation of cantilever 206.

AFM system 200 further comprises Q-control circuitry 224 configured to electronically control the quality factor of the cantilever 206. As discussed above, the quality factor of a cantilever having eigenfrequency $f_0$ and resonance peak half-width $f_{RPW}$ may be computed as the ratio of $f_0$ and $f_{RPW}$. Q-control circuitry 224 is configured to control the quality factor based, at least in part, on signal 215 that is proportional to the displacement of cantilever 206. For example, Q-control circuitry 224 may be configured to amplify and phase shift (e.g., by approximately 90 degrees or 270 degrees) the cantilever deflection signal 215 to generate output signal 225. In turn, output signal 225 is used to excite the dither piezo 210 in conjunction with control signal 209 (as shown, output signal 225 is added to control signal 209 to obtain control signal 211 used to drive the piezo 210). Accordingly, Q-control circuitry 224 may drive cantilever 206 based on a suitably amplified and phase-shifted cantilever deflection signal. The Q-control circuitry 224 may either increase or decrease the quality factor of cantilever 206, depending on the exact settings of circuitry 224 exact settings, and may control the quality factor of cantilever 206 to be in any suitable range (e.g., less than 300, 300-1000, 300-3000, less than 5000, etc.).

In some embodiments, controller 208 may identify operating parameters for cantilever 206 and control cantilever 206 to operate in accordance with the identified operating parameters. For example, controller 208 may be configured to obtain (e.g., calculate, access previously calculated, receive, etc.) operating parameters (e.g., one or more free oscillation amplitudes and/or one or more quality factors) for cantilever 206 such that, when cantilever 206 is controlled to operate in accordance with the obtained parameters, cantilever 206 exhibits a single stable oscillation state. Thus, in some embodiments, controller 208 may perform obtaining, based on at least one intrinsic parameter of the cantilever (e.g., a resonance frequency of the cantilever and/or a spring constant of the cantilever), a first quality factor and a first free oscillation amplitude, wherein the cantilever exhibits only one stable oscillation state when oscillating at the first free oscillation amplitude and operating at the first quality factor; and controlling the cantilever to exhibit the only one stable oscillation state by controlling the cantilever to oscillate at a fixed frequency at or near a resonance frequency of the cantilever, oscillate at the first free oscillation amplitude, and operate at the first quality factor.

Controller 208 may be implemented using dedicated hardware (e.g., a micro controller) or with hardware (e.g., one or more hardware processors) programmed using processor-executable instructions to perform any of the above-described and/or suitable functions.

It should be appreciated that AFM system 200 is merely illustrative and an AFM system configured to perform TO-AFM imaging may comprise one or more other components in addition to or instead of the components shown in FIG. 2. For example, although in the illustrated embodiment cantilever deflection is measured using laser beam deflection, any other suitable techniques for measuring cantilever oscillation may be used (e.g., optical interferometry techniques, laser Doppler vibrometry, piezoelectric/piezoresistive detection, capacitive detection, etc.). As another example, another device (e.g., a double-clamped beam, a plate, a rod, a half-domes, etc.) could be used instead of cantilever 206, as aspects of the technology described herein are not limited in this respect.

Figure 3:
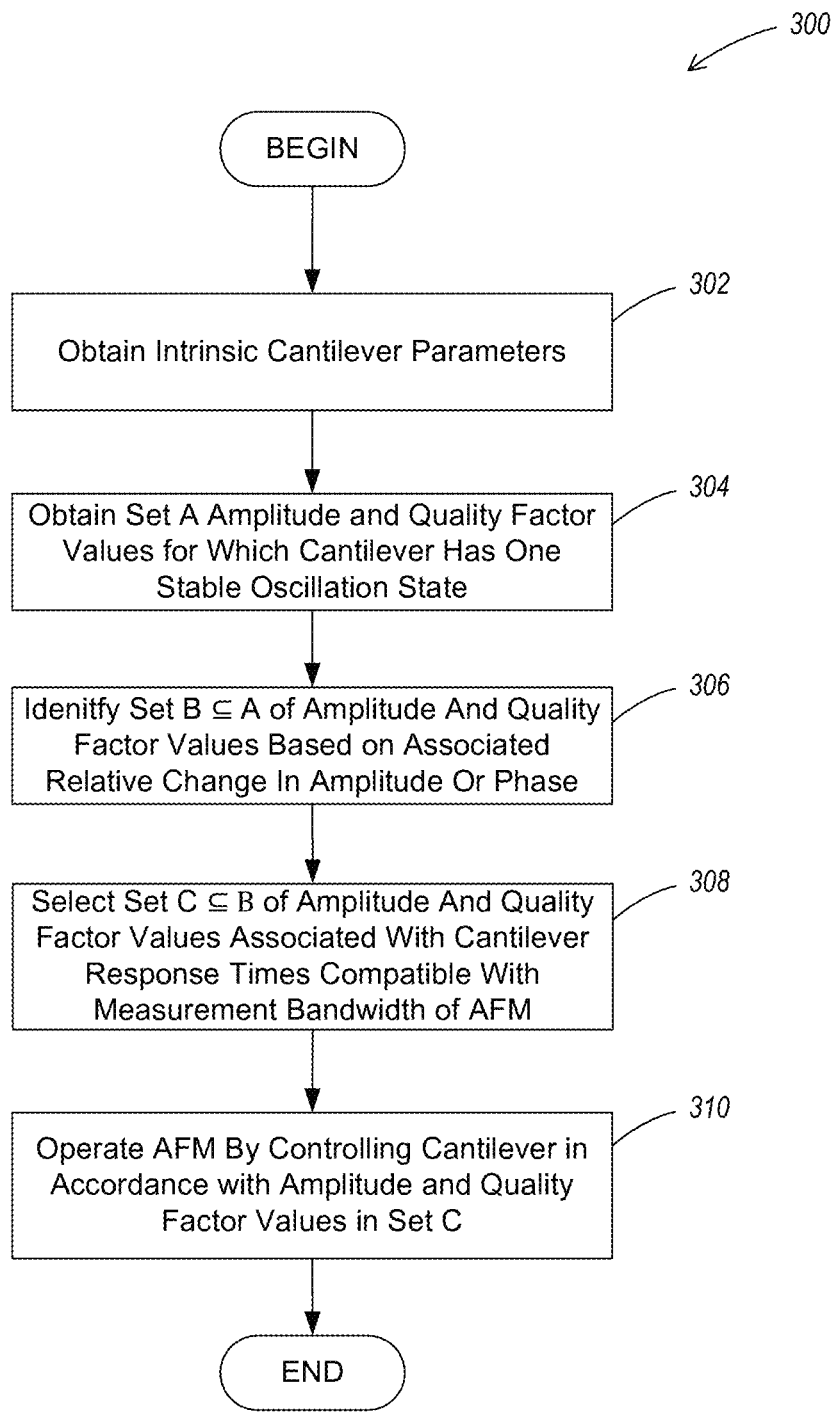
FIG. 3 is a flow chart of an illustrative process for performing TO-AFM imaging, in accordance with some embodiments of the technology described herein.

FIG. 3 is a flow chart of an illustrative process 300 for performing TO-AFM imaging, in accordance with some embodiments of the technology described herein. Process 300 may be performed by any suitable system and, for example, may be performed by illustrative AFM system 200 described with reference to FIG. 2.

Process 300 begins at act 302, where at least one intrinsic parameter for the AFM system's cantilever is obtained. The at least one intrinsic parameter may include the cantilever's fundamental resonance frequency and/or its spring constant.

Next, process 300 proceeds to act 304, where a set of free oscillation amplitudes and quality factors for which the cantilever has a single stable oscillation state is obtained based, at least in part, on the at least one intrinsic parameter of the cantilever obtained at act 302. The set of free oscillation amplitudes and quality factors may further be obtained based on information about the desired operating conditions of the cantilever such as the frequency at which the cantilever is to be driven (e.g., a frequency near or equal to the cantilever's fundamental resonance frequency or a frequency near or equal to one of the cantilever's other resonance frequencies) and a desired operational distance between the cantilever and the sample.

The set of free oscillation amplitudes and quality factors (that cause the cantilever to exhibit a single stable oscillation state at a time) may be obtained in any suitable way. For example, the free oscillation amplitudes and quality factors may be calculated based the cantilever's intrinsic parameters (e.g., fundamental resonance frequency and spring constant). Such a calculation may be performed, for example, by solving (e.g., numerically) an equation for motion describing they dynamics of the cantilever such as, for example, the following illustrative equation for cantilever dynamics in Q-controlled AM-AFM:

$$m\ddot{z}(t) + \frac{2\pi f_0 m}{Q_0}\dot{z}(t) + c_z(z(t) - d) + \underbrace{g c_z z(t - t_0)}_{Q\text{-Control}} = \underbrace{a_d c_z \cos(2\pi f_d t)}_{\text{external driving force}} + \underbrace{F_{ts}[z(t), \dot{z}(t)]}_{\text{tip-sample force}}.$$

In the above equation, $z(t)$ represents the position of the probe tip at the time t; $c_z$, m, and $f_0 = (c_z/m)^{0.5}/(2\pi)$ are the spring constant, the effective mass, and the eigenfrequency of the cantilever, respectively. In the above equation, it is assumed that the quality factor $Q_0$ unites the intrinsic damping of the cantilever and all influences from surrounding media such as air or liquid, if present, in a single overall value. The equilibrium position of the tip is denoted as d. Naturally, the two driving mechanisms are reflected in the equation. The active feedback of the system ("Q-Control term") is described by the retarded amplification of the displacement signal, i.e., the tip position z is measured at the retarded time $t-t_0$ and amplified by a gain factor g. The first term on the right-hand side of the equation represents the external driving force of the cantilever. It is modulated with the constant excitation amplitude ad at a fixed frequency $f_d$. The (non-linear) tip-sample interaction force $F_{ts}$ is introduced by the second term.

As another example, the free oscillation amplitudes and quality factors may have been previously calculated for one or more intrinsic cantilever parameter values (e.g., for one or more combinations of fundamental resonance frequency and spring constant values) and stored (e.g., on at least one non-transitory computer readable storage medium); the stored values may be accessed during act 304. Accordingly, the intrinsic cantilever parameters obtained at act 302 may be used to calculate or access/look-up previously calculated cantilever operational parameters at act 304. In some embodiments, suitable combinations of free oscillation amplitude and quality factor may also be obtained by experimental trial-and-error.

As one example of quality factors that may be obtained at act 304, the quality factors obtained at act 304 may include one or more quality factors of less than 300. As another example, the quality factors obtained at act 304 may include one or more quality factors between 300 and 1000. As yet another example, the quality factors obtained at act 304 may include one or more quality factors between 300 and 3000. As yet another example, the quality factors obtained at act 304 may include one or more quality factors less than 5000. It should be appreciated that conventional AM-AFM, when performed in a vacuum, involves operating the cantilever at a quality factor of greater than 5000. As one example of free oscillation amplitudes that may be obtained at act 304, the free oscillation amplitudes may include one or more amplitudes smaller than a decay length of an interaction potential between the probe tip and the sample. As another example, the free oscillation amplitudes obtained at act 304 may include one or more amplitudes smaller than 3 Angstroms. The set of free oscillation amplitudes and quality factors may include one or more combinations of free oscillation amplitudes taking values in the example ranges described above and quality factors taking values in the example ranges described above, so long as each combination, when used for controlling oscillation of the cantilever, causes the cantilever to exhibit a single stable oscillation state in a desired operational distance (or range of distances) to the surface of the sample of interest.

Figure 4:
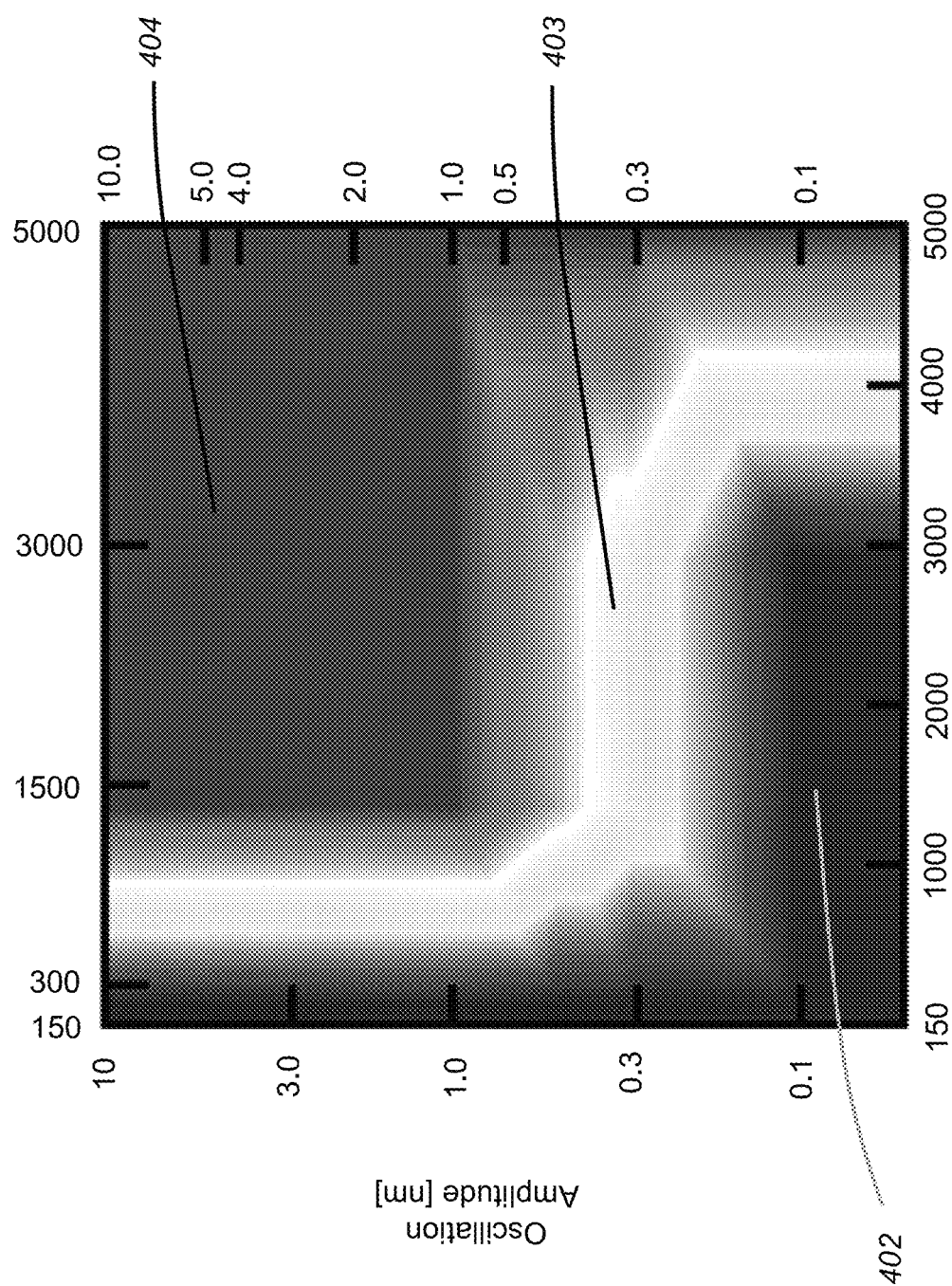
FIG. 4 illustrates amplitude and quality factor combinations associated with single stable oscillation states and multiple stable oscillation states, in accordance with some embodiments of the technology described herein.

FIG. 4 illustrates that some amplitude and quality factor combinations may be associated with single stable oscillation states while other amplitude and quality factor combinations may be associated with multiple stable oscillation states. In particular, FIG. 4 illustrates single stable oscillation state regimes and bi-stable oscillation regimes (i.e., a regime with two stable oscillation states) for a tuning fork having a spring constant of k=2000 N/m and a fundamental resonance frequency of $f_{res}$=22 kHz (and for a typical tip-sample interaction potential), which are typical values often used in the literature. The single stable oscillation state regime region 402 indicates combinations of free oscillation amplitudes and quality factors for which the tuning fork (when operated in accordance with these amplitudes and quality factors) would exhibit a single oscillation state. As may be seen in FIG. 4, region 402 includes all oscillation amplitudes 0.5-10 nm when the Q-factor is less than 300, and oscillation amplitudes smaller than 1 Angstrom for Q factors 300-3000. It can also be seen that once the Q factor is greater than 3000, the tuning fork does not exhibit a single stable oscillation state for any choice of oscillation amplitude. Indeed, as shown, the tuning fork exhibits two stable oscillation states for all combinations of amplitudes and quality factors not in region 402. As the Q-factor and oscillation amplitudes increases, the bi-stability gets "increasingly worse" in region 403, because the probe tip would jump a larger distance toward the sample when the instability hits in those regions. The region 404 indicates parameter combinations for which the tip would make the largest jumps from one oscillation state to another. Accordingly, parameter values in the single stable state region 402 are to be selected so that the tuning fork exhibits a single oscillation state at any time.

It may be seen, in FIG. 4, that the border between singly stable and bi-stable regimes is approximately at oscillation amplitudes of 1 Angstrom for quality factors between 300 and 3000. This may be because the decay length of the surface potential is about 1 Angstrom. When the quality factors are below 300, the tuning fork may exhibit a single stable oscillation state for almost all free oscillation amplitude values. By contrast, when the quality factors are above 3000, the tuning fork may exhibit multiple stable oscillation states for all free oscillation amplitude values that lay within the detection sensitivity of the photoelectric device 214 and/or the lock-in amplifier 216.

It should be appreciated that typical quality factors encountered in AM-AFM are larger than 5000 for microscopes operated in vacuum. As a result, in some instances, without active Q control (e.g., lowering the Q factor using a circuit that is designed to do so, such as quality factor control circuitry 224), it may not be possible to operate a cantilever a single stable oscillation regime.

After a set of free oscillation amplitudes and quality factors for which the cantilever has one stable oscillation state in a desired range of operation is obtained at act 304, process 300 proceeds to act 306, where a subset of the free oscillation amplitudes and quality factors obtained at act 304 is selected to include those combinations that are associated with the larger/largest relative changes in cantilever oscillation amplitude and/or phase so that cantilever oscillation changes are easier to detect. That is, at act 306, the combinations of free oscillation amplitudes and quality factors that are selected are ones that make it easier to detect changes in cantilever oscillation amplitude and/or phase due to surface forces. The combinations of free oscillation amplitudes and quality factors may be selected based on whether they lead to larger relative changes in related amplitude and/or phase as compared to combinations that are not selected. The selection may be performed in any suitable way and, for example, may be performed based on experimental indications (e.g., experimental trial and error to identify favorable combinations of oscillation amplitudes and quality factors). Using combinations of amplitudes and quality factors that are associated with large relative changes in cantilever oscillation amplitude and/or phase, in turn, enables the TO-AFM system to more precisely control the distance between the probe tip and the surface.

Next, process 300 proceeds to act 308, where a subset of the free oscillation amplitudes and quality factors obtained at act 306 is selected to include those combinations that are compatible with the measurement bandwidth of the system executing process 300 (e.g., AFM system 200). In this way, the cantilever may be operated with a quality factor that results in a measurement bandwidth associated with acceptable data acquisition times. To this end, selecting smaller values of Q results in faster data acquisition times. For example, as described above, the cantilever response time is given by $\tau=Q/\pi f_0$. In the untuned case, with Q=10,000 and $f_0$=20 kHz, the cantilever response time $\tau$=160 ms. If 160 ms were needed to collect each data point, a simple 256×256 image would require three hours to record, which may not be practical. On the other hand, when the quality factor Q is set to 500, the time required to record the same image drops to 9 minutes; atomic-resolution images with less pixel-pixel variation, can be required even faster.

Next, process 300 proceeds to act 310 where the cantilever is controlled in accordance with a combination of the free oscillation amplitudes and quality factors obtained at act 308. This may be done in any suitable way. For example, the cantilever may be driven using a frequency at or near a resonance frequency of the cantilever (e.g., a frequency at or near a fundamental frequency of the cantilever or a frequency at or near a multiple of the fundamental frequency of the cantilever). Next, the observed quality factor ($Q_1$) of the oscillating cantilever may be measured (the measured Q factor may depend on various factors such as the environment, temperature, specifics of the cantilever holder mounting, etc.) to determine whether there is any particular free oscillation amplitude ($A_1$) such that the combination ($Q_1$ and $A_1$) is one of the combinations of operational values selected at act 308. If there is such a particular free oscillation amplitude, then the AFM system may control the cantilever to oscillate at the particular free oscillation amplitude (i.e., operate with quality factor $Q_1$ and free oscillation amplitude $A_1$). If not, then the quality factor may be adjusted to a different value ($Q_2$) for which there is an associated free oscillation amplitude ($A_2$) such that the combination ($Q_2$ and $A_2$) is one of the combinations of operational values selected at act 308. The quality factor may be adjusted in any suitable way and, for example, may be adjusted electronically (e.g., via an electronic scheme that provides the phase-shifted cantilever deflection signal back into the cantilever's driving signal after appropriate amplification, as described above). Alternatively, the Q factor may be modified by other means such as by increasing the damping of the cantilever by adding glue at strategically chosen points, etc.

It should be appreciated that process 300 is illustrative and that there are variations of process 300. For example, in some embodiments, one or both acts 306 and 308 may be omitted.

The TO-AFM mode is further illustrated below with reference to results of applying the TO-AFM mode to generating AFM images of three different materials: graphite, surface oxidized copper, and sodium fluoride. Graphite was chosen because of its status as a prototypical van der Waals material featuring low surface interactions, surface-oxidized copper was selected because force and tunneling current can be conveniently recorded together and the respective contrasts are well understood, and measurements were performed on sodium fluoride to illustrate TO-AFM's ability to image the surface atoms of a bulk insulator. Sodium fluoride was also chosen as the substrate for force spectroscopy. During data acquisition, the cantilever was driven at its first eigenfrequency (i.e., $f_d=f_0$).

Figure 5B:
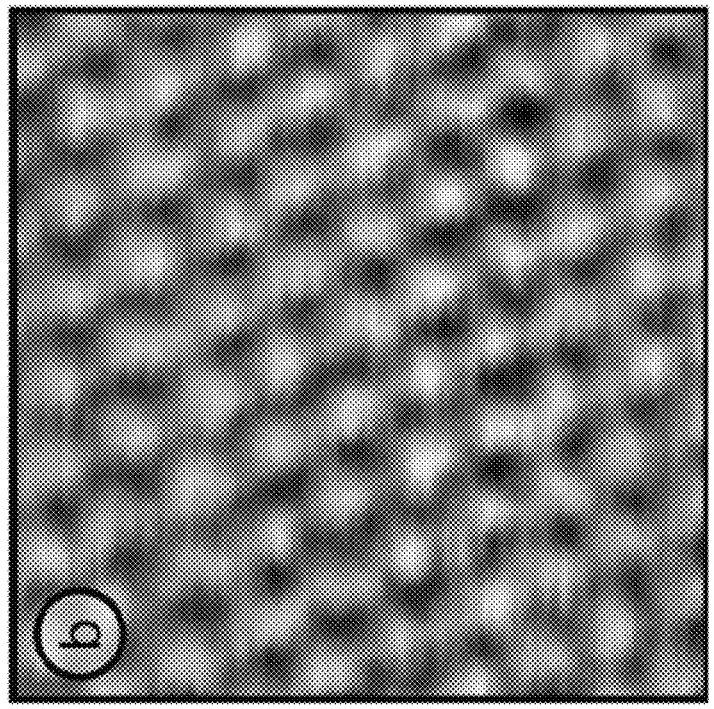
FIGS. 5A-5B illustrate application of TO-AFM to generating an image of graphite, in accordance with some embodiments of the technology described herein.
Figure 5A:
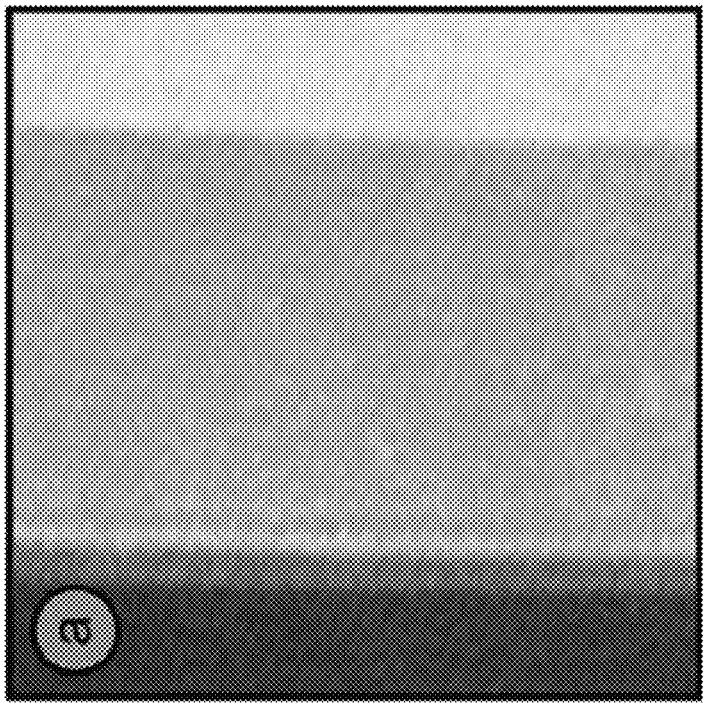

FIGS. 5A and 5B illustrate application of TO-AFM to generating an image of graphite. Highly oriented pyrolytic graphite has a long tradition as a test sample for AFM dating back to the first observation of atomic lattice periodicity in 1987. While resolving lattice periodicity in contact mode and atomic resolution imaging by scanning tunneling microscopy have always been considered "easy," the low surface interactions of this van der Waals material have made atomic resolution imaging with NC-AFM challenging. Typically, specialized equipment (such as low temperature microscopes) or unconventional approaches (such as imaging at higher eigenmodes, using torsional resonances or by imaging in high viscosity liquids) have been required to achieve atomic resolution. In contrast, we are able to image graphite at room temperature in a vacuum at both the large scales (as shown in FIG. 5A) and atomic scales (as shown in FIG. 5B). The quality of both images confirms the viability of TO-AFM as a new high resolution imaging mode.

The images shown in FIGS. 5A and 5B are TO-AFM images of highly oriented pyrolytic graphite. The sample was cleaved right before introduction to the ultrahigh vacuum (UHV) system and then imaged with no further sample preparation. FIG. 5A shows a large-scale image (110 nm×110 nm) revealing three step edges of single unit cell height each. FIG. 5B shows an atomic-resolution image (2.0 nm×2.0 nm; corrugation≈25 pm); note that in NC-AFM images of graphite, protrusions reflect the locations of the hollow sites rather than the positions of the carbon atoms. The imaging parameters used to obtain the images in FIGS. 5A and 5B: $Q_{eff}$=300, $f_0$=13,410 Hz, $A_{free}$=2.8 Å; (FIG. 5A) oscillation amplitude=1.8 Å, scan speed vscan=100 nm/s; (FIG. 5B) oscillation amplitude A=1.2 Å, vscan=6 nm/s.

FIGS. 6A-D illustrate application of TO-AFM to generating an image of surface-oxidized copper. Copper-containing oxides have attracted interest since they are active catalysts for a number of important reactions including methanol synthesis, the water gas shift reaction, and the reduction of nitrogen oxides. In addition, understanding the behavior of surface oxides is crucial to unraveling the atomic-scale details of bulk oxidation and corrosion of metals. For Cu(100), $O_2$ exposure at elevated temperatures leads to a $(2\sqrt{2}\times\approx2)R45°$ missing row reconstruction (Cu (100)-O) in which every fourth row of Cu atoms along [010] is removed. The oxygen atoms nestle along each side of the remaining three atoms wide Cu strands resulting in strikingly different structural arrangements for oxygen and copper atoms. The oxygen atoms are arranged in rectangles of equal length (3.6 Å), but alternating width (3.5 Å and 3.7 Å), while the one-third of the copper atoms in the middle-row are chemically distinct from the 'bridging' Cu atoms along the edges of the strands.

FIG. 6A presents a large-scale TO-AFM image of the bare Cu(100) surface, with atomically flat terraces separated by half unit cell steps (1.8 Å). Upon exposure to oxygen (20 minutes at $5\times10^{-6}$ mbar) at T≈300° C., the step edges rearrange along the <001> directions due to the formation of the Cu(100)-O surface phase (FIG. 6B). FIGS. 6C and 6D illustrate the capability of TO-AFM for high-resolution, multi-channel data acquisition, with FIG. 6C representing the TO-AFM topography channel, and FIG. 6D the simultaneously recorded tunneling current. Based on a published in-depth analysis of the atomic-scale contrast on the Cu(100)-O surface for both force and current channels, we deduce that the tip was oxygen-terminated. Through this assignment, we determine that brightest protrusions reflect middle-row copper atoms in both data channels, with bridging copper producing additional contrast.

Specifically, FIG. 6A shows a large-scale TO-AFM image (136 nm×136 nm) of the bare Cu(100) surface obtained after heating the copper crystal to 800° C. for 15 minutes, revealing atomically flat terraces separated by half-unit cell steps. Impurities that pin the step edges following annealing can be observed at several kink sites. FIG. 6B shows a large-scale TO-AFM image (80 nm×80 nm) of the copper surface after oxidation (Cu(100)-O surface). Re-arrangement of the step edges along the [001] and [010] directions is clearly visible. FIGS. 6C and 6D show simultaneously recorded high-resolution images (5.0 nm×5.0 nm) of TO-AFM topography (in FIG. 6C), and tunneling current (in FIG. 6D). Dominant protrusions reflect the middle-row copper atoms with secondary contrast from the bridging copper atoms, with the distance between the lines formed by middle-row copper being 7.2 Å. The image comprises two orthogonal domains oriented along the [001] and [010] directions. Imaging parameters: $Q_{eff}$=500, $f_0$=10,860 Hz, $A_{free}$=2.6 Å; (FIGS. 6A-B) A=2.0 Å, vscan=80 nm/s; (FIGS. 6C-D) A=1.2 Å, Ubias=0.7 V, Itunnel=350 pA, vscan=2.2 nm/s.

Figure 7B:
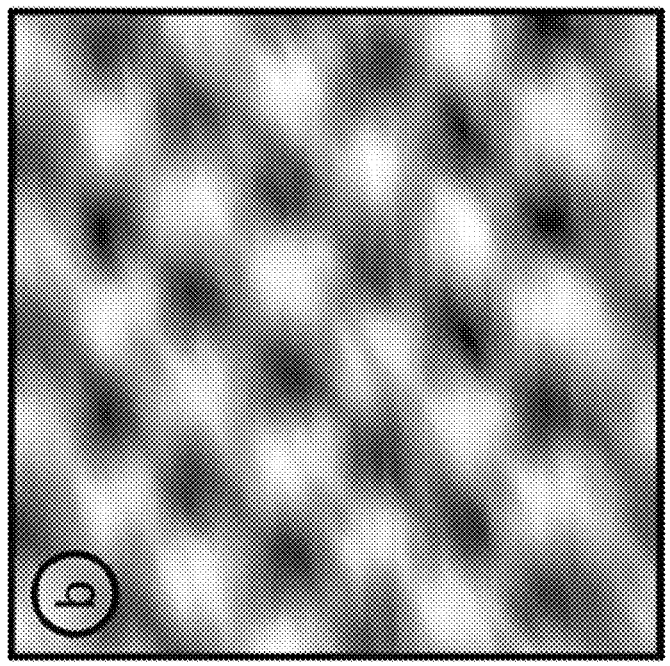
FIGS. 7A-7B illustrate application of TO-AFM to generating an image of sodium fluoride, in accordance with some embodiments of the technology described herein.
Figure 7A:
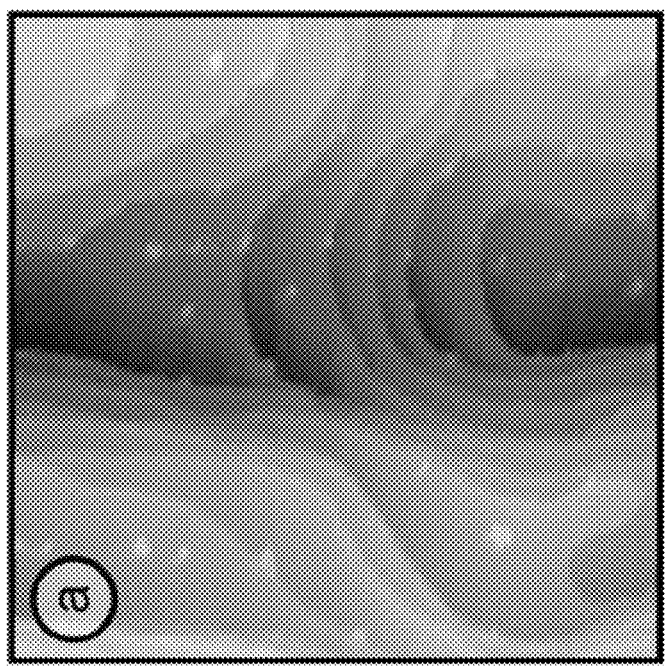

FIGS. 7A-B illustrate application of TO-AFM to generating an image of sodium fluoride. Alkali halides have long served as versatile test samples for high-resolution NC-AFM as they are highly insulating on the one hand, but easy to prepare through cleavage on the other. FIG. 7A shows results obtained with TO-AFM on the large scale, and FIG. 7B shows results obtained with TO-FM on the atomic scale. The sample was cleaved under ambient conditions and exposed to air for about 5 minutes before introduction into the UHV system; to remove adsorbed water, the sample was heated in situ to 150° C. for 30 minutes.

Specifically, FIG. 7A shows a large-scale image (600 nm×600 nm) revealing rounded step edges of half unit cell height (2.3 Å) and scattered impurities. FIG. 7B shows an atomic-resolution TO-AFM topography image (1.8 nm×1.8 nm) of NaF(100) surface; the distance between individual atoms corresponds to the 3.3 Å F—F or Na—Na nearest-neighbor distance. Imaging parameters: $Q_{eff}$=500, $f_0$=10,860 Hz, Afree=2.8 Å; (FIG. 7A) A=2.2 Å, vscan=120 nm/s; (FIG. 7B) A=1.6 Å, vscan=3.0 nm/s.

It should also be appreciated that TO-AFM may be used for force spectroscopy. One of the strengths of FM-AFM is its force spectroscopy capability: Measuring the frequency shift F as a function of the nearest tip-sample distance D allows the subsequent recovery of the interaction force F as a function of distance (F(D) curves). As described below, TO-AFM is a fully capable replacement for FM-AFM because TO-AFM may be used to record high-quality force spectroscopy curves deep into the repulsive regime.

Figure 8A:
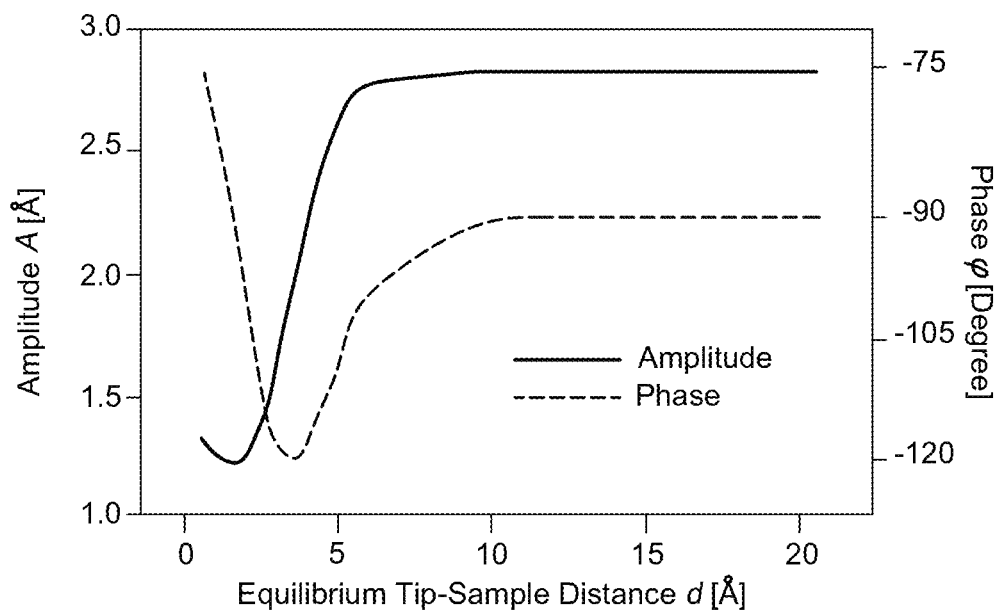
FIGS. 8A-8B illustrate recovering force-distance and tip-sample interaction potential curves from experimentally measured data, in accordance with some embodiments of the technology described herein.
Figure 8B:
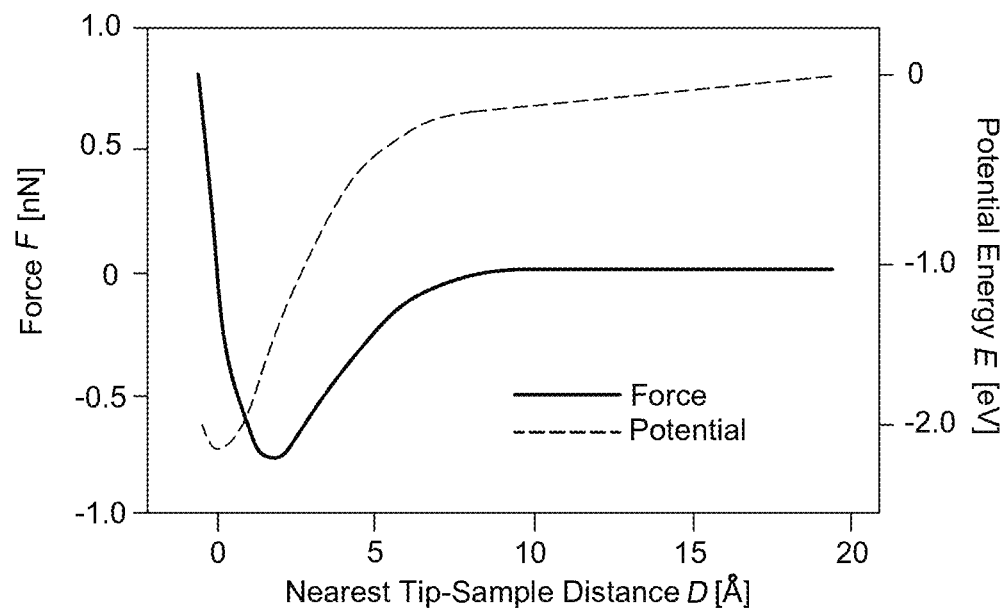

The theoretical framework for reconstructing force curves using conventional AM-AFM suffers from the same hurdles that have previously limited AM-AFM imaging in vacuum. In particular, jumps upon approach of the probe tip to the surface of the sample, prevent the recovery of complete F(D) curves and insufficient dynamic range within the regime of short-range attractive forces leads to poor data quality. Since TO-AFM overcomes both of these hurdles, it possesses the desired full force spectroscopy capabilities. As shown in FIGS. 8A-B, both the force F and the tip-sample interaction potential E can be recovered from experimentally measured data with very high quality despite room temperature operation. Thanks to the robustness of TO-AFM-based spectroscopy, these curves can easily be recorded deep into the repulsive regime (positive tip-sample forces) with no significant increase in noise, which is often difficult with FM-AFM-based spectroscopy. The force and tip-sample interaction potential, may be calculated from the amplitude A(d) and phase φ(d) in any suitable way. For example, in some embodiments, the tip-sample potential in the AM-mode can be calculated using the integral equation:

$$U_{ts}(D) = 2c_z \int_D^\infty K(z)\left[(z-D) + \sqrt{\frac{A}{16\pi}}\sqrt{z-D} + \frac{A^{3/2}}{\sqrt{2(z-D)}}\right]dz,$$

where $$K(D, A) = \frac{1}{2}\left[\frac{a_{exc}}{A}\cos\phi + \frac{f_0^2 - f_d^2}{f_0^2}\right].$$

To solve this integral equation, the last term of which contains a pole at z=D, the transformation $z=D+t^2$ may be applied and the following transformed integral equation:

$$U_{ts}(D) = 4c_z \int_D^\infty K(D+t)^2\left[t^3 + \sqrt{\frac{A}{16\pi}}t^2 + \frac{A^{3/2}}{\sqrt{2}}\right]dt$$

may be solved to calculate the tip-sample potential from measured amplitude and phase data. For example, this transformed integral equation may be used to solve for the tip sample potential shown in FIG. 8B from the amplitude and phase data shown in FIG. 8A. After solving for the tip-sample potential, the tip-sample force may be obtained, for example, by fitting a polynomial (e.g., a $9^{th}$ order polynomial) to the tip-sample potential and obtaining the tip-sample force as the negative gradient of the tip-sample potential according to: $F_{ts}=-\partial U_{ts}/\partial D$.

Figure 9A:
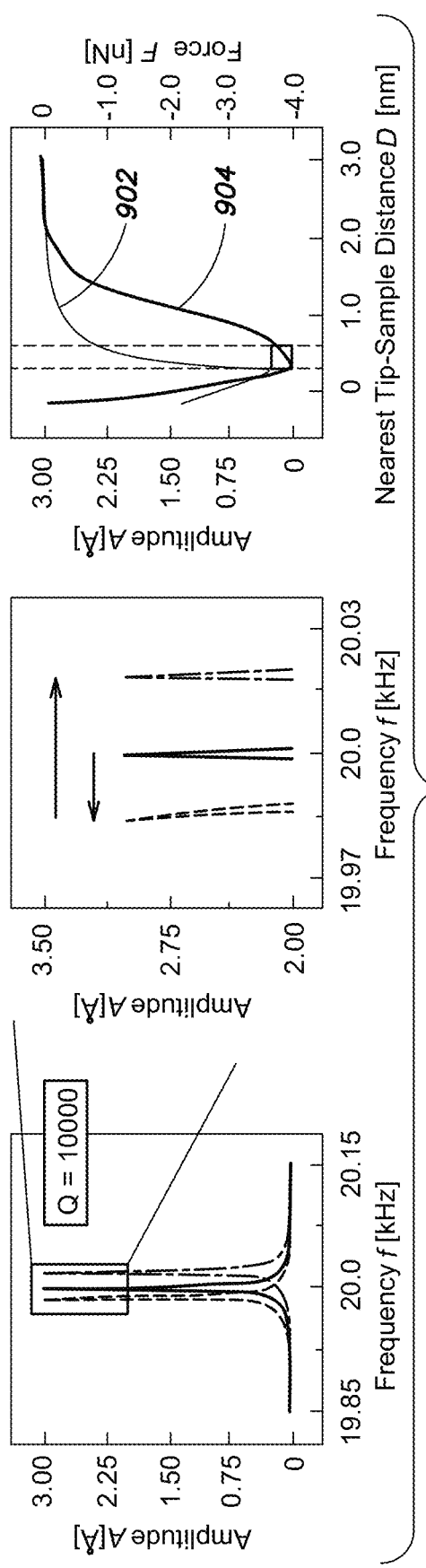
FIGS. 9A-9C illustrate changes of the oscillation behavior with active tuning of the damping behavior for a tuning fork, in accordance with some embodiments of the technology described herein.
Figure 9B:
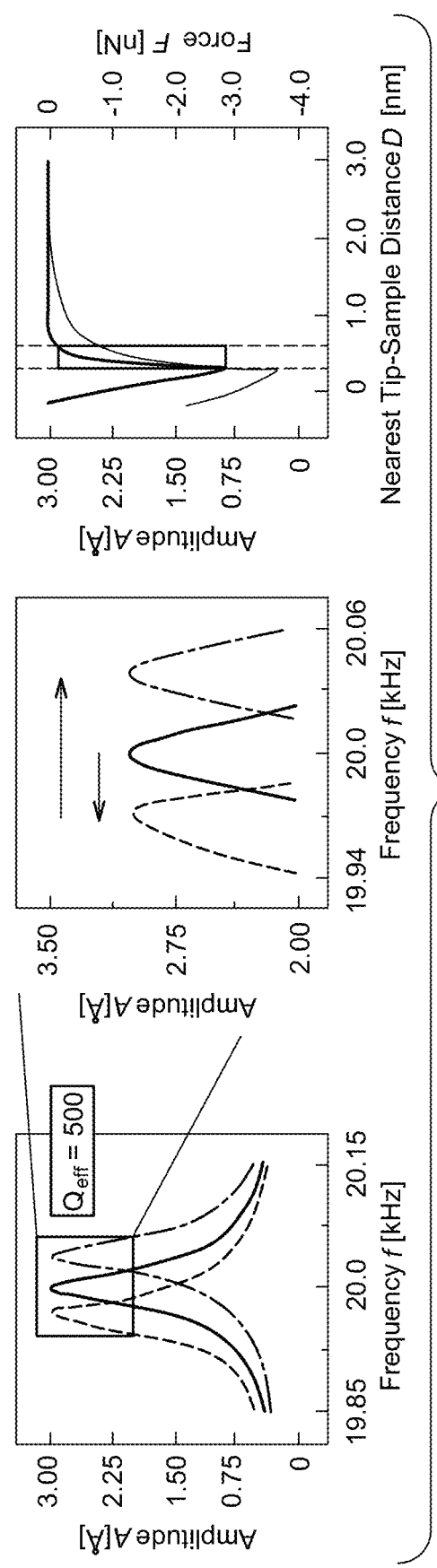
Figure 9C:
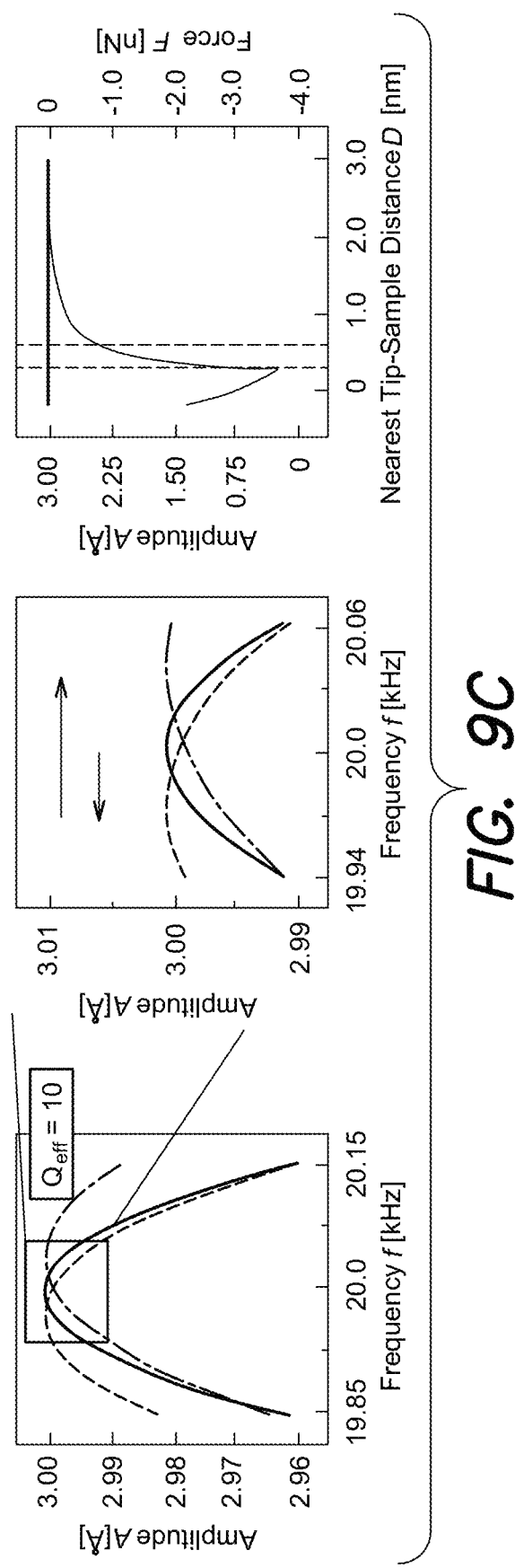

FIGS. 9A-9C provide a further illustration of cantilever oscillation in a vacuum environment. FIG. 9A illustrates the situation for typical tuning fork vacuum operating parameters. The starting point is the left panel, where the solid curve shows the symmetric, Lorentzian resonance peak for the free cantilever far from the surface. As the tip approaches the surface the resonance curve shifts to the left and the tip oscillates in the attractive regime (dashed line at d=6.6 Å with the origin being set by a suitably selected model force). Approaching even further, the resonance peak moves to the right and the tip oscillates well in the repulsive regime (dash-dotted line, d=−10 Å). The arrows in the middle panel indicate that the resonance peak first moves towards lower frequencies and then reverses due to the influence of repulsive surface forces, eventually moving towards the right of the eigenfrequency. Due to the bending of the dashed curve towards the left, multiple stable solutions arise at driving frequencies between ≈19.982 kHz and ≈19.984 kHz. While this solves hurdle (i) for driving frequencies greater than 20 kHz, we see by comparing the force curve 902 in the right panel and the amplitude curve 904 that between D=6 Å and the force minimum, the amplitude has dropped to near zero (grey box), which impedes amplitude determination. At set points typical to ambient AM-AFM operation (between 20% and 80% of the free amplitude), on the other hand, the tip has not yet approached the surface sufficiently to detect the short-range forces that high-resolution surface mapping relies on. Thus, the sensitivity is compromised, which renders this approach impractical.

By lowering the effective quality factor $Q_{eff}$ to 500, using active damping control, as shown in FIG. 9B, the resonance peak broadens sufficiently to eliminate multiple solutions for all driving frequencies. In addition, we gather from the right panel of FIG. 9B that oscillation amplitudes between ≈2.9 Å and ≈0.9 Å are now associated with tip-sample distances in the attractive regime (grey box). Due to this 10× higher drop, A can now be used to control the tip-sample distance with excellent signal-to-noise ratio. For even lower $Q_{\it eff}$, however, amplitude changes eventually decrease until virtually no reduction in amplitude is detectable. FIG. 9C illustrates this case for $Q_{\it eff}$=10, where the amplitude curve in the right panel is constant at A=3 Å for all tip-sample distances.

Specifically, FIGS. 9A-9C illustrate changes of the oscillation behavior with active tuning of the damping behavior for a tuning fork with $f_0$=20 kHz, $c_z$=2 kN/m, and Q=10,000 oscillating with an amplitude $A_{\it free}$=3 Å far from the surface. (FIG. 9A) Left panel: Resonance curves of the untuned cantilever away from the surface (middle curve, solid line), within the attractive regime (left, dashed line), and within the repulsive regime (right, dash-dotted line). Middle panel: Magnification of the left panel. Right panel: Tip-sample model potential (curve 902, right axis) and the resulting amplitude dependence (curve 904, left axis) as a function of the nearest tip-sample distance D=d−A for $f_d$=20 kHz. Although no instabilities are encountered, the dynamic range of the amplitude drop available for controlling the tip-sample distance within the short-range attractive forces regime (marked by vertical dotted lines) is insufficient for accurate position control (gray square). (FIG. 9B) Same as FIG. 9A, but for a tuned cantilever with $Q_{\it eff}$=500 and dashed curve at d=5 Å. This choice of $Q_{\it eff}$ eliminates multiple stable oscillation states at any possible driving frequency and leads to a 10-fold increase in the dynamic range for the amplitude drop within the short-range attractive force regime (gray square). (FIG. 9C) For $Q_{\it eff}$=10, the oscillation amplitude remains nearly unchanged during approach (straight-line curve, right panel). Dashed curve is at d=5.4 Å. The dash-dotted curves are at d=−10 Å in all panels.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with hardware (e.g., one or more processors) specially-programmed using computer-executable functions to perform the functions recited above.

In this respect, it should be appreciated that one implementation of the embodiments comprises at least one non-transitory computer-readable storage medium (e.g., a computer memory, a USB drive, a flash memory, a compact disk, etc.) encoded with a computer program (i.e., a plurality of instructions), which, when executed on a processor, performs the above-discussed functions of the embodiments of the technology described herein. The computer-readable storage medium can be transportable such that the program stored thereon can be loaded onto any computer resource to implement the aspects of the technology discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed features.

Various aspects of the technology described herein may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the technology described herein may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Having described several embodiments in detail, various modifications and improvements will readily occur to those skilled in the art. Such modifications and improvements are intended to be within the spirit and scope of the disclosure. Accordingly, the foregoing description is by way of example only, and is not intended as limiting.

What is claimed is:

1. A method for controlling operation of an atomic force microscope, the atomic force microscope comprising a cantilever and configured to image a surface of a sample using a probe tip coupled to the cantilever, the method comprising:
  using a controller to perform:
    prior to controlling the cantilever to image the surface of the sample while exhibiting only one stable oscillation state by oscillating the cantilever at or near its resonance frequency and at a first free oscillation amplitude and a first quality factor which are associated with the only one stable oscillation state,
    determining the first quality factor and the first free oscillation amplitude using the resonance frequency and a spring constant of the cantilever, wherein the cantilever exhibits the only one stable oscillation state when oscillating at the first free oscillation amplitude and operating at the first quality factor, wherein the first free oscillation amplitude is smaller than 3 Angstroms and the first quality factor is between 300 and 1000; and
    after determining the first quality factor and the first free oscillation amplitude, controlling the cantilever of the atomic force microscope to exhibit the only one stable oscillation state by controlling the cantilever to oscillate at a fixed frequency at or near the resonance frequency of the cantilever, oscillate at the first free oscillation amplitude, and operate at the first quality factor.

2. The method of claim 1, wherein controlling the cantilever to operate at the first quality factor comprises using quality factor control circuitry to automatically control the cantilever to operate at the first quality factor.

3. The method of claim 1, wherein the first free oscillation amplitude is smaller than a decay length of an interaction potential between the probe tip and the sample.

4. The method of claim 1, wherein controlling the cantilever comprises controlling the cantilever to operate such that the probe tip is at a distance of 2-10 Angstroms from the surface of the sample.

5. The method of claim 1, wherein the determining the first quality factor and the first free oscillation amplitude comprises:
obtaining a plurality of quality factors and a plurality of free oscillation amplitudes; and
selecting, as the first quality factor and the first free oscillation amplitude, a quality factor in the plurality of quality factors and a free oscillation amplitude that maximize relative amplitude and/or phase changes in the oscillation of the cantilever during approach to the surface of the sample.

6. The method of claim 1, wherein the determining the first quality factor and the first free oscillation amplitude comprises:
obtaining a plurality of quality factors and a plurality of free oscillation amplitudes; and
selecting, as the first quality factor and the first free oscillation amplitude, a quality factor in the plurality of quality factors and a free oscillation amplitude that correspond to a desired measurement bandwidth of the atomic force microscope.

7. A system for controlling operation of an atomic force microscope, the atomic force microscope comprising a cantilever and configured to image a surface of a sample using a probe tip coupled to the cantilever, the system comprising:
a controller configured to perform:
prior to controlling the cantilever to image the surface of the sample while exhibiting only one stable oscillation state by oscillating the cantilever at or near its resonance frequency and at a first free oscillation amplitude and a first quality factor which are associated with the only one stable oscillation state, wherein the first free oscillation amplitude is smaller than 3 Angstroms and the first quality factor is between 300 and 1000,
determining the first quality factor and the first free oscillation amplitude using the resonance frequency and a spring constant of the cantilever, wherein the cantilever exhibits the only one stable oscillation state when oscillating at the first free oscillation amplitude and operating at the first quality factor; and
after determining the first quality factor and the first free oscillation amplitude, controlling the cantilever of the atomic force microscope to exhibit the only one stable oscillation state by controlling the cantilever to oscillate at a fixed frequency at or near the resonance frequency of the cantilever, oscillate at the first free oscillation amplitude, and operate at the first quality factor.

8. The system of claim 7, further comprising quality factor control circuitry, wherein controlling the cantilever to operate at the first quality factor comprises using the quality factor control circuitry to automatically control the cantilever to operate at the first quality factor.

9. The system of claim 7, wherein the first free oscillation amplitude is smaller than a decay length of an interaction potential between the probe tip and the sample.

10. The system of claim 7, wherein controlling the cantilever comprises controlling the cantilever to operate such that the probe tip is at a distance of 2-10 Angstroms from the surface of the sample.

11. The system of claim 7, wherein the determining the first quality factor and the first free oscillation amplitude comprises:
obtaining a plurality of quality factors and a plurality of free oscillation amplitudes; and
selecting, as the first quality factor and the first free oscillation amplitude, a quality factor in the plurality of quality factors and a free oscillation amplitude that maximize relative amplitude and/or phase changes in the oscillation of the cantilever during approach to the surface of the sample.

12. The system of claim 7, wherein the determining the first quality factor and the first free oscillation amplitude comprises:
obtaining a plurality of quality factors and a plurality of free oscillation amplitudes; and
selecting, as the first quality factor and the first free oscillation amplitude, a quality factor in the plurality of quality factors and a free oscillation amplitude that correspond to a desired measurement bandwidth of the atomic force microscope.

13. The method of claim 1, wherein determining the first quality factor and the first free oscillation amplitude comprises accessing, in at least one non-transitory computer readable storage medium, previously calculated cantilever operational parameters for the resonance frequency and the spring constant of the cantilever.

* * * * *